(12) United States Patent
Glass

(10) Patent No.: X8002
(45) Date of Patent: Feb. 6, 1834

(54) CUTTING SAUSAGE MEAT

(76) Inventor: Valentine Glass

Valentine Glass of Washington County Maryland
Letters Patent

The Schedule referred to in these Letters Patent and making part of the same
containing a description in the words of the said Valentine Glass himself
of his improvement in the machine for cutting Sausage meat:

To all to whom these presents shall come. Be it Known that I. Valen
entine Glass of Washington County and State of Maryland have inven
ted a new and useful machine & improvement for cutting sausage or mince.
and that the following is a full and exact description of the construction &
... operation of said machine as invented by me. First I construct an
oblong squared timber of any dimensions consisting of five pieces which form
the bottom of the whole frame, upon the cross pieces at the two ends, of this
frame I raise two upright posts of from 14 to 20 inches in height, into
the top of which posts are mortised two pieces of squared timber running with
the longest part of the square, forming the top of the whole frame. in the
centre of these pieces, across the smallest diameter of the square is mortised
a cross piece of from 4 to 6 inches. into which is fastened the centre upright
post. thro which the iron shaft of the horizontal wheel runs which iron
shaft rests on and runs in a gudgeon fastened on the centre cross piece of
the bottom frame. the centre upright post is squared timber of 4 to 6 inches
and rests within half an inch at its lower end on the centre of the horizon
tal cog wheel on the bottom of the tub. into this part on two opposite
squares are let in the ends of the iron shaft of two perpendicular cog wheels,
the other ends of these shafts let into a cross piece fastened into the upright
outside posts of the whole frame. The bottom of the tub is of solid wood
with the grain upwards, and in the centre it projects upwards 1/2 inch
made circular around which projection is an iron band, and on the top of
this projection is fastened an iron cog wheel, which is operated on by the crank
or master wheel and which operates on the two perpendicular cog wheels
on the two opposite squares of the centre post. thro the centre of these cog
wheels runs an iron shaft, on the ends of which rest the circle of the tub
in a circular head of wood accurately turned, to which head I attach two circular Knives, by screwing them on the circular head, the cutting edg
of the Knives projecting at least one & half inch beyond the head of the [illegible].
these Knives operating perpendicular present their cutting edge to the bottom
of the revolving tub; to the outer circle of this bottom of solid timber form
ing the bottom of the tub are attached the staves of the tub like an
ordinary constructed tub. the iron shafts to which are attached the
perpendicular wheels and the Knives are operated on at the outer end
by a piece of iron pressing on the shaft. The upper end of this iron is
kept down by an iron spring. So that if any bones or hard substances g
under the Knives, the shafts must yield, and the Knives thrown upwards
the inner end of these shafts is kept down by a piece of iron sliding o
the centre posts, and kept down by a screw thus preventing the perpen
dicular cog wheels from being thrown out of the horizontal wheel.

On the one side of the bottom frame I raise two perpendicular po
of squared wood made from 7 to 8 inches in height and a cross piece m
tised on the top for receiving the shaft to which a common crank is atta
at the outer end and to the inner end is attached a perpendicular cog or
master wheel, which operates on the horizontal cog wheel fastened to
the bottom of the tub the end of the shaft working in a gudgeon
fastened to the centre upright post. When the crank is operated
on the master wheel operates on the horizontal cog wheel which being fa
tened to the bottom of the tub and connected with the two small perpen
dicular wheels on whose shafts the Knives are fastened of course the wh
tub and Knives revolve and operate on the meat which is cut in sm
pieces and thrown into the tub. To prevent the centre upright po
from giving way when the machine is in motion, I have fastened to
one of the cross pieces forming the top of the frame a piece of iron of
a half moon, whose concave is secured on the upright post and
into which the shaft of the crank works.

In order to keep the meat under the Knives I have placed a piece
of iron hook near the centre or horizontal wheel fastened to a small
piece of wood let down from the top of the frame to near the bottom of
the tub, this throws the meat from the centre and another woode

[illegible] let down from the cross piece of the top frame near the staves of the tub throws the meat towards the centre, thus keeping it under the knives. To keep the knives clean and prevent their choking I simply use a wooden comb let down from the top of the frame and projecting between the knives to prevent the meat from being thrown over the top of the tub I fasten on one of the outside upright posts. a piece of thin board which runs over the top of the tub and is sawed out so that on the inside of the top it projects downwards several inches Valentine Glass [illegible]

Witnesses
Wm. Brentler.
Joshua Grimes (1022 Words)

(Granted Feb. 6. 1834)